(12) United States Patent
Arai

(10) Patent No.: US 12,459,506 B2
(45) Date of Patent: Nov. 4, 2025

(54) VEHICLE CONTROL DEVICE FOR MANAGING DRIVING FORCE DURING RESUMPTION OF CONSTANT-SPEED CONTROL FROM OVERRIDE

(71) Applicant: SUBARU CORPORATION, Tokyo (JP)

(72) Inventor: Shoto Arai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 378 days.

(21) Appl. No.: 17/674,544

(22) Filed: Feb. 17, 2022

(65) Prior Publication Data

US 2022/0266828 A1 Aug. 25, 2022

(30) Foreign Application Priority Data

Feb. 24, 2021 (JP) ................................ 2021-027855

(51) Int. Cl.
*B60W 30/14* (2006.01)

(52) U.S. Cl.
CPC ....... *B60W 30/143* (2013.01); *B60W 2520/10* (2013.01); *B60W 2540/10* (2013.01); *B60W 2552/15* (2020.02)

(58) Field of Classification Search
CPC .......... B60W 30/143; B60W 2520/10; B60W 2540/10; B60W 2552/15; B60W 50/10;

(Continued)

(56) References Cited

U.S. PATENT DOCUMENTS

| 2007/0150158 A1* | 6/2007 | Inoue .............. B60W 30/18027 701/67 |
| 2016/0031442 A1* | 2/2016 | Brockley .............. B60W 50/06 701/54 |

(Continued)

FOREIGN PATENT DOCUMENTS

JP 2008-221935 A 9/2008

OTHER PUBLICATIONS

Rac, "How to use cruise control," 2018. (Year: 2018).*

(Continued)

*Primary Examiner* — Aniss Chad
*Assistant Examiner* — Stephanie T Su
(74) *Attorney, Agent, or Firm* — Rimon P.C.

(57) ABSTRACT

A vehicle control device includes a controller switching between normal and constant-speed control modes. The normal mode involves controlling a vehicle driving force in accordance with an acceleration-deceleration operation. The constant-speed control mode involves controlling the driving force regardless of the acceleration-deceleration operation to maintain a vehicle speed at a target vehicle speed. In the constant-speed control mode, the controller executes constant-speed control involving calculating the target driving force using integral control and controlling the driving force to the target driving force, interrupts the constant-speed control if a requested driving force corresponding to an accelerator-pedal opening degree exceeds the target driving force, executes override involving controlling the driving force to the requested driving force, and sets an integral-control component based on the requested driving force during the override if a wheel fails to pass over a step when the override is terminated and the constant-speed control is to be resumed.

18 Claims, 7 Drawing Sheets

(58) Field of Classification Search
CPC ....... B60W 2050/001; B60W 2552/00; B60W 2710/105; B60W 30/182; B60W 2540/12
See application file for complete search history.

(56) References Cited

U.S. PATENT DOCUMENTS

2016/0325748 A1* 11/2016 Mori .................. B60W 10/08
2017/0088135 A1*  3/2017 Kelly ................. B60W 10/184
2017/0267236 A1*  9/2017 Das ................... B60W 10/04
2018/0148063 A1*  5/2018 Tatsushiro ...... B60W 30/18009

OTHER PUBLICATIONS

Davis, "Where Does The "336" Come From In The Speed/RPM/Gear-Ratio/ Tire-Size Formula?" Hot Rod, 2015. (Year: 2015).*
RAC Drive, "How to Use Cruise Control" (Year: 2018).*

* cited by examiner

VEHICLE CONTROL DEVICE FOR MANAGING DRIVING FORCE DURING RESUMPTION OF CONSTANT-SPEED CONTROL FROM OVERRIDE

CROSS-REFERENCE TO RELATED APPLICATIONS

The present application claims priority from Japanese Patent Application No. 2021-027855 filed on Feb. 24, 2021, the entire contents of which are hereby incorporated by reference.

BACKGROUND

The disclosure relates to vehicle control devices.

For the purpose of assisting a driver in a driving operation, a known vehicle is capable of executing a constant-speed control mode (e.g., cruise control mode) in addition to a normal mode of controlling the driving force of the vehicle in accordance with an acceleration-and-deceleration operation (i.e., controlling of the accelerator pedal and the brake pedal) by the driver. In the constant-speed control mode, constant-speed control (e.g., cruise control) involving controlling the driving force of the vehicle is executed without being dependent on the acceleration-and-deceleration operation by the driver such that the vehicle speed of the vehicle is maintained at a target vehicle speed, as disclosed in, for example, Japanese Unexamined Patent Application Publication No. 2008-221935.

SUMMARY

An aspect of the disclosure provides a vehicle control device to be applied to a vehicle. The vehicle control device includes a controller configured to execute a normal mode and a constant-speed control mode in a switching manner. The normal mode involves controlling a driving force of the vehicle in accordance with an acceleration-and-deceleration operation by a driver who drives the vehicle. The constant-speed control mode involves controlling the driving force of the vehicle without being dependent on the acceleration-and-deceleration operation by the driver such that a vehicle speed of the vehicle is maintained at a target vehicle speed. In the constant-speed control mode, the controller is configured to execute constant-speed control involving using integral control based on an integrated value of a deviation between the vehicle speed and the target vehicle speed to calculate the target driving force and controlling the driving force of the vehicle to the target driving force, interrupt the constant-speed control in a case where a requested driving force corresponding to a degree of opening of an accelerator pedal of the vehicle during the constant-speed control exceeds the target driving force in the constant-speed control, and execute override involving controlling the driving force of the vehicle to the requested driving force, and set a component of the integral control of the target driving force based on the requested driving force during the override in a case where a wheel of the vehicle has failed to pass over a step when the override is terminated and the constant-speed control is to be resumed.

An aspect of the disclosure provides a vehicle control device to be applied to a vehicle. The vehicle control device includes circuitry. The circuitry is configured to execute a normal mode and a constant-speed control mode in a switching manner. The normal mode involves controlling a driving force of the vehicle in accordance with an acceleration-and-deceleration operation by a driver who drives the vehicle. The constant-speed control mode involves controlling the driving force of the vehicle without being dependent on the acceleration-and-deceleration operation by the driver such that a vehicle speed of the vehicle is maintained at a target vehicle speed. The circuitry is configured to execute constant-speed control in the constant-speed control mode. The constant-speed control involves using integral control based on an integrated value of a deviation between the vehicle speed and the target vehicle speed to calculate the target driving force and controlling the driving force of the vehicle to the target driving force. The circuitry is configured to interrupt the constant-speed control in the constant-speed control mode in a case where a requested driving force corresponding to a degree of opening of an accelerator pedal of the vehicle during the constant-speed control exceeds the target driving force in the constant-speed control, and execute override involving controlling the driving force of the vehicle to the requested driving force. The circuitry is configured to set a component of the integral control of the target driving force in the constant-speed control mode based on the requested driving force during the override in a case where a wheel of the vehicle has failed to pass over a step when the override is terminated and the constant-speed control is to be resumed.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
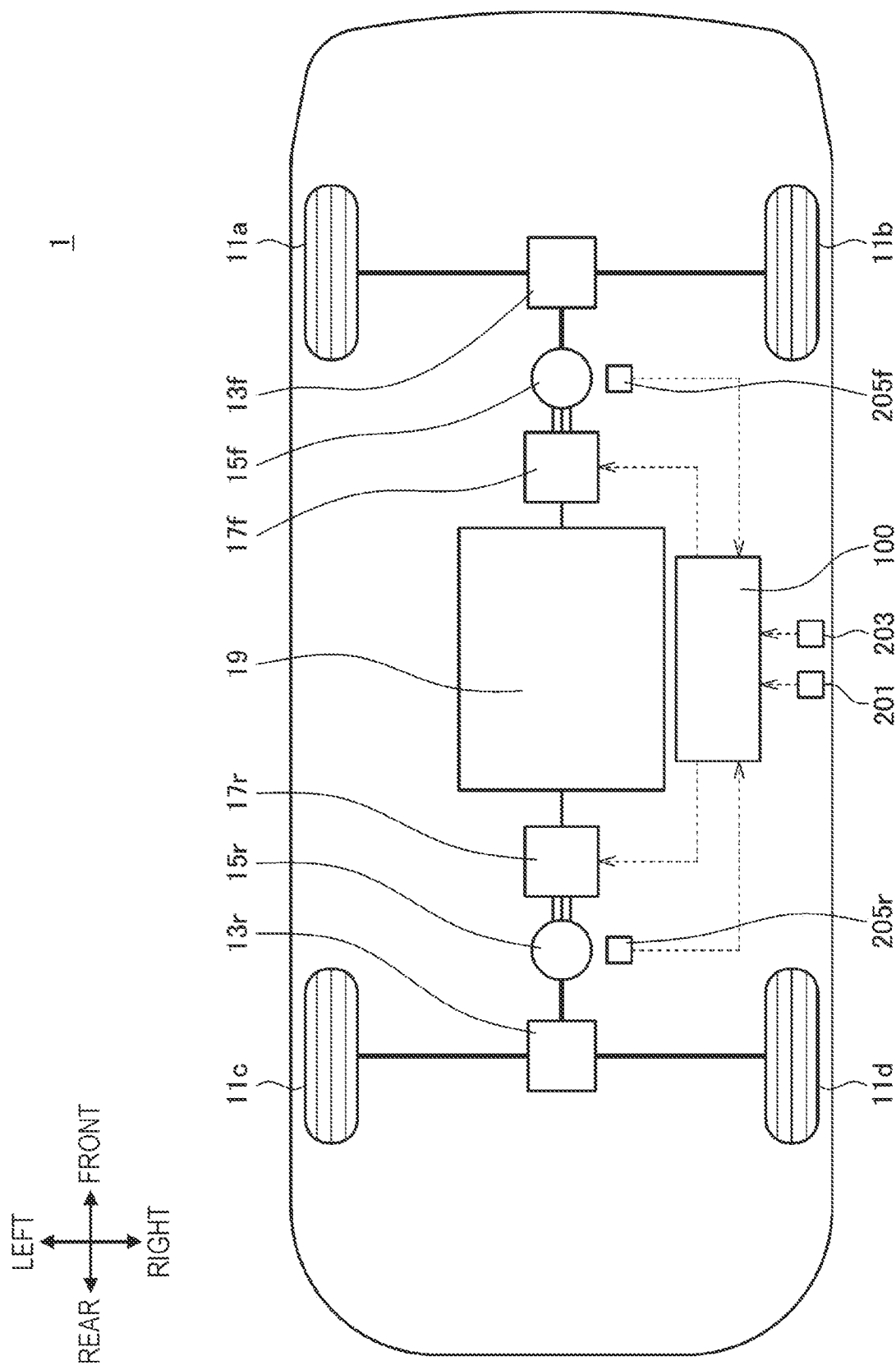
FIG. 1 schematically illustrates the configuration of a vehicle equipped with a control device according to an embodiment of the disclosure.

In the constant-speed control mode, when the driver operates the accelerator pedal, the constant-speed control is interrupted, and override involving controlling the driving force of the vehicle to a requested driving force corresponding to the degree of opening of the accelerator pedal is sometimes executed. In a situation where the vehicle is trying to ride over a step on the road while executing the constant-speed control mode, the wheels may sometimes abut on the step and fail to pass over the step. In this case, override may sometimes be executed as a result of the driver operating the accelerator pedal to cause the vehicle to ride over the step. If the accelerator pedal is released while the wheels have failed to pass over the step, the override ends, and the constant-speed control resumes.

The target driving force in the constant-speed control may sometimes be controlled in accordance with feedback control, such as proportional-integral-differential (PID) control. In this case, the target driving force in the constant-speed control may possibly include an integral-control component based on an integrated value of a deviation between the vehicle speed and the target vehicle speed. In the related art, the integral-control component of the target driving force is normally in a reset state (i.e., zero) when the constant-speed control is to be resumed. Thus, the override ends in a state where the wheels have failed to pass over the step. When the constant-speed control resumes, the driving force of the vehicle is insufficient, possibly causing, for example, the vehicle to roll back on an uphill road.

It is desirable to provide a vehicle control device capable of resolving an insufficient driving force of a vehicle when a constant-speed control mode resumes after override is executed during the constant-speed control mode.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Vehicle Configuration

The configuration of a vehicle 1 equipped with a control device 100 according to an embodiment of the disclosure will now be described with reference to FIG. 1 and FIG. 2.

FIG. 1 schematically illustrates the configuration of the vehicle 1. In FIG. 1, the vehicle 1 is illustrated in a state where the advancing direction is defined as a forward direction, the reverse direction opposite the advancing direction is defined as a rearward direction, and the left and right sides when the vehicle 1 is facing forward are defined as leftward and rightward directions, respectively.

The vehicle 1 is an electric vehicle that is equipped with driving motors (i.e., a front-wheel driving motor 15$f$ and a rear-wheel driving motor 15$r$) as driving sources and that runs by using power output from the driving motors.

The vehicle 1 to be described below is simply an example of a vehicle equipped with a control device according to an embodiment of the disclosure. As will be mentioned later, the configuration of a vehicle equipped with the control device according to the embodiment of the disclosure is not particularly limited to the configuration of the vehicle 1.

As illustrated in FIG. 1, the vehicle 1 includes front wheels 11$a$ and 11$b$, rear wheels 11$c$ and 11$d$, a front differential device 13$f$, a rear differential device 13$r$, the front-wheel driving motor 15$f$, the rear-wheel driving motor 15$r$, an inverter 17$f$, an inverter 17$r$, a battery 19, the control device 100, an accelerator-pedal opening-degree sensor 201, a brake sensor 203, a front-wheel-motor rotation-speed sensor 205$f$, and a rear-wheel-motor rotation-speed sensor 205$r$.

The front wheel 11$a$, the front wheel 11$b$, the rear wheel 11$c$, and the rear wheel 11$d$ may simply be referred to as "wheels 11" if they are not to be distinguished from one another. The front-wheel driving motor 15$f$ and the rear-wheel driving motor 15$r$ may simply be referred to as "driving motors 15" if they are not to be distinguished from each other. The inverter 17$f$ and the inverter 17$r$ may simply be referred to as "inverters 17" if they are not to be distinguished from each other. The front-wheel-motor rotation-speed sensor 205$f$ and the rear-wheel-motor rotation-speed sensor 205$r$ may simply be referred to as "motor rotation-speed sensors 205" if they are not to be distinguished from each other.

The front-wheel driving motor 15$f$ is a driving motor that outputs power for driving the front wheels 11$a$ and 11$b$. The front wheel 11$a$ corresponds to a left front wheel, and the front wheel 11$b$ corresponds to a right front wheel.

For example, the front-wheel driving motor 15$f$ is driven by using electric power supplied from the battery 19. The front-wheel driving motor 15$f$ is coupled to the front differential device 13$f$. The front differential device 13$f$ is coupled to the front wheels 11$a$ and 11$b$ by using driving shafts. Power output from the front-wheel driving motor 15$f$ is transmitted to the front differential device 13$f$ and is subsequently transmitted distributively to the front wheels 11$a$ and 11$b$ by the front differential device 13$f$.

The front-wheel driving motor 15$f$ is, for example, a polyphase alternating-current motor and is coupled to the battery 19 with the inverter 17$f$ interposed therebetween. Direct-current power supplied from the battery 19 is converted into alternating-current power by the inverter 17$f$, and the alternating-current power is supplied to the front-wheel driving motor 15$f$.

In addition to having a function of outputting power for driving the front wheels 11$a$ and 11$b$, the front-wheel driving motor 15$f$ also functions as an electricity generator that generates electricity by using kinetic energy of the front wheels 11$a$ and 11$b$. When the front-wheel driving motor 15$f$ is to function as an electricity generator, electricity is generated by the front-wheel driving motor 15$f$, and a braking force according to regenerative braking is applied to the vehicle 1. Alternating-current power generated by the front-wheel driving motor 15$f$ is converted into direct-current power by the inverter 17$f$, and the direct-current power is supplied to the battery 19. Accordingly, the battery 19 is electrically charged.

The rear-wheel driving motor 15$r$ outputs power for driving the rear wheels 11$c$ and 11$d$. The rear wheel 11$c$ corresponds to a left rear wheel, and the rear wheel 11$d$ corresponds to a right rear wheel.

For example, the rear-wheel driving motor 15$r$ is driven by using power supplied from the battery 19. The rear-wheel driving motor 15$r$ is coupled to the rear differential device 13$r$. The rear differential device 13$r$ is coupled to the rear wheels 11$c$ and 11$d$ by using driving shafts. Power output from the rear-wheel driving motor 15$r$ is transmitted to the rear differential device 13$r$ and is subsequently transmitted distributively to the rear wheels 11$c$ and 11$d$ by the rear differential device 13$r$.

The rear-wheel driving motor 15$r$ is, for example, a polyphase alternating-current motor and is coupled to the battery 19 with the inverter 17*r* interposed therebetween. Direct-current power supplied from the battery 19 is converted into alternating-current power by the inverter 17*r*, and the alternating-current power is supplied to the rear-wheel driving motor 15*r*.

In addition to having a function of outputting power for driving the rear wheels 11*c* and 11*d*, the rear-wheel driving motor 15*r* also functions as an electricity generator that generates electricity by using kinetic energy of the rear wheels 11*c* and 11*d*. When the rear-wheel driving motor 15*r* is to function as an electricity generator, electricity is generated by the rear-wheel driving motor 15*r*, and a braking force according to regenerative braking is applied to the vehicle 1. Alternating-current power generated by the rear-wheel driving motor 15*r* is converted into direct-current power by the inverter 17*r*, and the direct-current power is supplied to the battery 19. Accordingly, the battery 19 is electrically charged.

The accelerator-pedal opening-degree sensor 201 detects the degree of opening of the accelerator pedal and outputs the detection result. The degree of opening of the accelerator pedal indicates an amount by which the accelerator pedal is operated by the driver.

The brake sensor 203 detects a brake-pedal operation amount, indicating an amount by which the brake pedal is operated by the driver, and outputs the detection result.

The front-wheel-motor rotation-speed sensor 205*f* detects the rotation speed of the front-wheel driving motor 15*f* and outputs the detection result. The rear-wheel-motor rotation-speed sensor 205*r* detects the rotation speed of the rear-wheel driving motor 15*r* and outputs the detection result. The detection results of the motor rotation-speed sensors 205 are used as information indicating the rotation speed of a power transmission shaft (i.e., a shaft included in a power transmission system between the driving motors 15 and the wheels 11) of the vehicle 1 in processing performed by the control device 100.

The control device 100 includes a central processing unit (CPU) serving as an arithmetic processor, a read-only memory (ROM) serving as a storage element that stores, for example, programs and arithmetic parameters to be used by the CPU, and a random access memory (RAM) serving as a storage element that temporarily stores suitably-varying parameters used by the CPU.

The control device 100 communicates with devices (e.g., the inverters 17, the accelerator-pedal opening-degree sensor 201, the brake sensor 203, and the motor rotation-speed sensors 205) equipped in the vehicle 1. The communication between the control device 100 and each of the devices is realized by using, for example, controller area network (CAN) communication.

Figure 2:
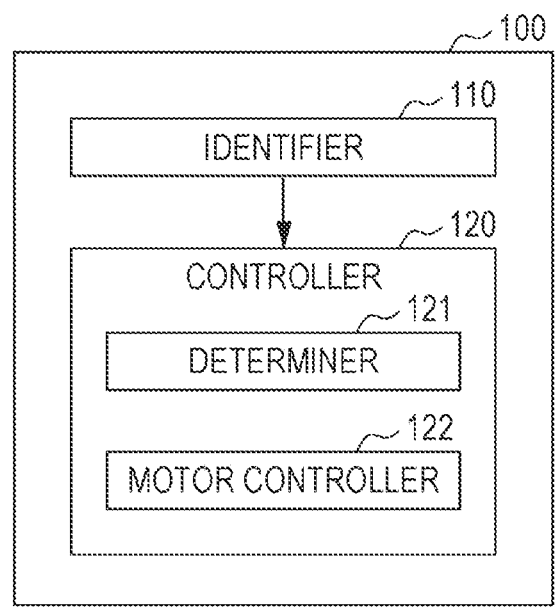
FIG. 2 is a block diagram illustrating an example of a functional configuration of the control device according to the embodiment of the disclosure.

FIG. 2 is a block diagram illustrating an example of a functional configuration of the control device 100.

For example, as illustrated in FIG. 2, the control device 100 has an identifier 110 and a controller 120.

The identifier 110 identifies the vehicle speed of the vehicle 1 (which may simply be referred to as "vehicle speed" hereinafter) based on the rotation speed of the power transmission shaft of the vehicle 1. Information indicating the vehicle speed identified by the identifier 110 is output to the controller 120 and is used in processing performed by the controller 120.

For example, the identifier 110 identifies the vehicle speed based on the detection results of the motor rotation-speed sensors 205. The vehicle speed may be identified by using the detection results of both the front-wheel-motor rotation-speed sensor 205*f* and the rear-wheel-motor rotation-speed sensor 205*r* or by using the detection result of either one of the front-wheel-motor rotation-speed sensor 205*f* and the rear-wheel-motor rotation-speed sensor 205*r*. Furthermore, the vehicle speed may be identified by using information (e.g., information indicating the rotation speed of the driving shafts that couple the wheels 11 and the differential devices) other than the detection results of the motor rotation-speed sensors 205 as the information indicating the rotation speed of the power transmission shaft of the vehicle 1.

The controller 120 controls the operation of each device in the vehicle 1 so as to control the traveling of the vehicle 1. For example, the controller 120 includes a determiner 121 and a motor controller 122.

The determiner 121 performs various kinds of determination by using information transmitted to the control device 100 from each device in the vehicle 1. A determination result obtained by the determiner 121 is used in various kinds of processing performed by the controller 120.

The motor controller 122 controls the operation of the inverters 17 to control the operation of the driving motors 15. For example, the motor controller 122 controls the operation of a switching element of the inverter 17*f* to control the supply of electric power between the battery 19 and the front-wheel driving motor 15*f*. Accordingly, the motor controller 122 can control the generation of power and electricity by the front-wheel driving motor 15*f*. Furthermore, the motor controller 122 controls the operation of a switching element of the inverter 17*r* to control the supply of electric power between the battery and the rear-wheel driving motor 15*r*. Accordingly, the motor controller 122 can control the generation of power and electricity by the rear-wheel driving motor 15*r*.

When the motor controller 122 is to apply a driving force to the vehicle 1 by driving the driving motors 15, the motor controller 122 may drive both the front-wheel driving motor 15*f* and the rear-wheel driving motor 15*r*, or may drive either one of the front-wheel driving motor 15*f* and the rear-wheel driving motor 15*r*. The distribution of driving forces of the driving motors 15 in a case where both the front-wheel driving motor 15*f* and the rear-wheel driving motor 15*r* are to be driven may be appropriately set. By controlling the driving forces of the driving motors 15, the motor controller 122 can control the driving force of the vehicle 1 (i.e., the driving force to be applied to the vehicle 1).

The controller 120 is capable of executing the travel mode of the vehicle 1 in a switching manner between a normal mode and a constant-speed control mode. A normal mode is a travel mode in which the driving force of the vehicle 1 is controlled in accordance with an acceleration-and-deceleration operation (i.e., controlling of the accelerator pedal and the brake pedal) by the driver. A constant-speed control mode is a travel mode in which the driving force of the vehicle 1 is controlled without being dependent on the acceleration-and-deceleration operation by the driver such that the vehicle speed of the vehicle 1 is maintained at a target vehicle speed. The constant-speed control mode may sometimes be referred to as "cruise control mode".

Furthermore, the controller 120 is capable of executing the constant-speed control mode in a switching manner between a high-constant-speed control mode and a low-constant-speed control mode. The high-constant-speed control mode may sometimes be referred to as "high-speed cruise control mode", and the low-constant-speed control mode may sometimes be referred to as "low-speed cruise control mode". In the low-constant-speed control mode, the target vehicle speed is set to a value lower than that in the high-constant-speed control mode. For example, the target vehicle speed in the high-constant-speed control mode is set to a speed ranging between 20 km/h and 115 km/h inclusive, and the target vehicle speed in the low-constant-speed control mode is set to a speed ranging between 2 km/h and 15 km/h inclusive. The target vehicle speed in the constant-speed control mode is adjustable in accordance with, for example, an input operation by the driver.

For example, the vehicle 1 is provided with an input device (e.g., either one of a switch and a button) for selecting any one of the normal mode, the high-constant-speed control mode, and the low-constant-speed control mode, such that the driver can select a travel mode by operating the input device. The controller 120 executes the travel mode selected by the driver. If a specific operation, such as a braking operation, is performed by the driver while the constant-speed control mode is being executed, the controller 120 terminates the constant-speed control mode and switches to the normal mode.

In the normal mode, the controller 120 controls the operation of the driving motors 15 such that the driving force of the vehicle 1 is set to a driving force corresponding to the degree of opening of the accelerator pedal. Accordingly, the driving force of the vehicle 1 can be controlled in accordance with an operation performed on the accelerator pedal by the driver. Furthermore, the controller 120 controls the operation of a brake device, such as a hydraulic brake device, equipped in the vehicle 1 such that a braking force applied to the vehicle 1 is set to a braking force corresponding to an amount by which the brake pedal is operated. Accordingly, the braking force applied to the vehicle 1 can be controlled in accordance with an operation performed on the brake pedal by the driver. In the constant-speed control mode, the controller 120 calculates a target driving force and controls the driving force of the vehicle 1 to the target driving force such that the vehicle speed approaches the target vehicle speed. For example, the controller 120 utilizes feedforward control based on the vehicle speed and feedback control (e.g., PID control) based on a deviation between the vehicle speed and the target vehicle speed to calculate the target driving force. In this case, a calculated target driving force Fc is expressed by Expression (1) indicated below.

$$Fc = Ff + Fp + Fi + Fd \quad (1)$$

In Expression (1), Ff denotes a feedforward-control component based on the vehicle speed, Fp denotes a proportional-control component (i.e., P-component) based on a deviation between the vehicle speed and the target vehicle speed, Fi denotes an integral-control component (i.e., I-component) based on an integrated value of the deviation, and Fd denotes a derivative-control component (i.e., D-component) based on a derivative value of the deviation. The driving force Fp of the P-component is obtained by, for example, multiplying the deviation by a gain. The driving force Fi of the I-component is obtained by, for example, multiplying the integrated value of the deviation by a gain. The driving force Fd of the D-component is obtained by, for example, multiplying the derivative value of the deviation by a gain. The driving force Ff of the feedforward-control component corresponds to an estimated driving force for maintaining the vehicle speed at the target vehicle speed in a case where the vehicle 1 is traveling on a flat road. A flat road refers to a road in which an absolute value of a gradient (i.e., an inclination in the advancing direction of the vehicle 1 relative to the horizontal direction) is smaller than or equal to a predetermined value.

The method for calculating the target driving force Fc of the driving motors 15 is not limited to the calculation example using Expression (1). For example, the feedforward control may be omitted from the above example (i.e., the driving force Ff may be omitted from Expression (1)), or the PID control may be replaced with proportional-integral (PI) control (i.e., the driving force Fd may be omitted from Expression (1)).

The function that the control device 100 according to this embodiment has may partially be distributed to a plurality of control devices, or a plurality of functions may be realized by a single control device. In a case where the function that the control device 100 has is partially distributed to a plurality of control devices, the plurality of control devices may be coupled to each other by using a communication bus, such as a CAN.

As mentioned above, the controller 120 of the control device 100 is capable of executing the constant-speed control mode involving controlling the driving force of the vehicle 1 without being dependent on the acceleration-and-deceleration operation by the driver so as to maintain the vehicle speed at the target vehicle speed. If the accelerator pedal is operated by the driver while the constant-speed control mode is being executed, the controller 120 can interrupt the constant-speed control and execute override involving controlling the driving force of the vehicle 1 to a requested driving force corresponding to the degree of opening of the accelerator pedal. In this embodiment, the driving-force control at the time when the override is terminated and the constant-speed control is to be resumed is designed so that an insufficient driving force of the vehicle 1 is resolved when the constant-speed control resumes after the override is executed during the constant-speed control mode. The process related to the driving-force control performed by the controller 120 during the constant-speed control mode will be described below in detail.

Operation of Control Device

The operation of the control device 100 according to this embodiment of the disclosure will now be described with reference to FIG. 3 to FIG. 7.

Figure 3:
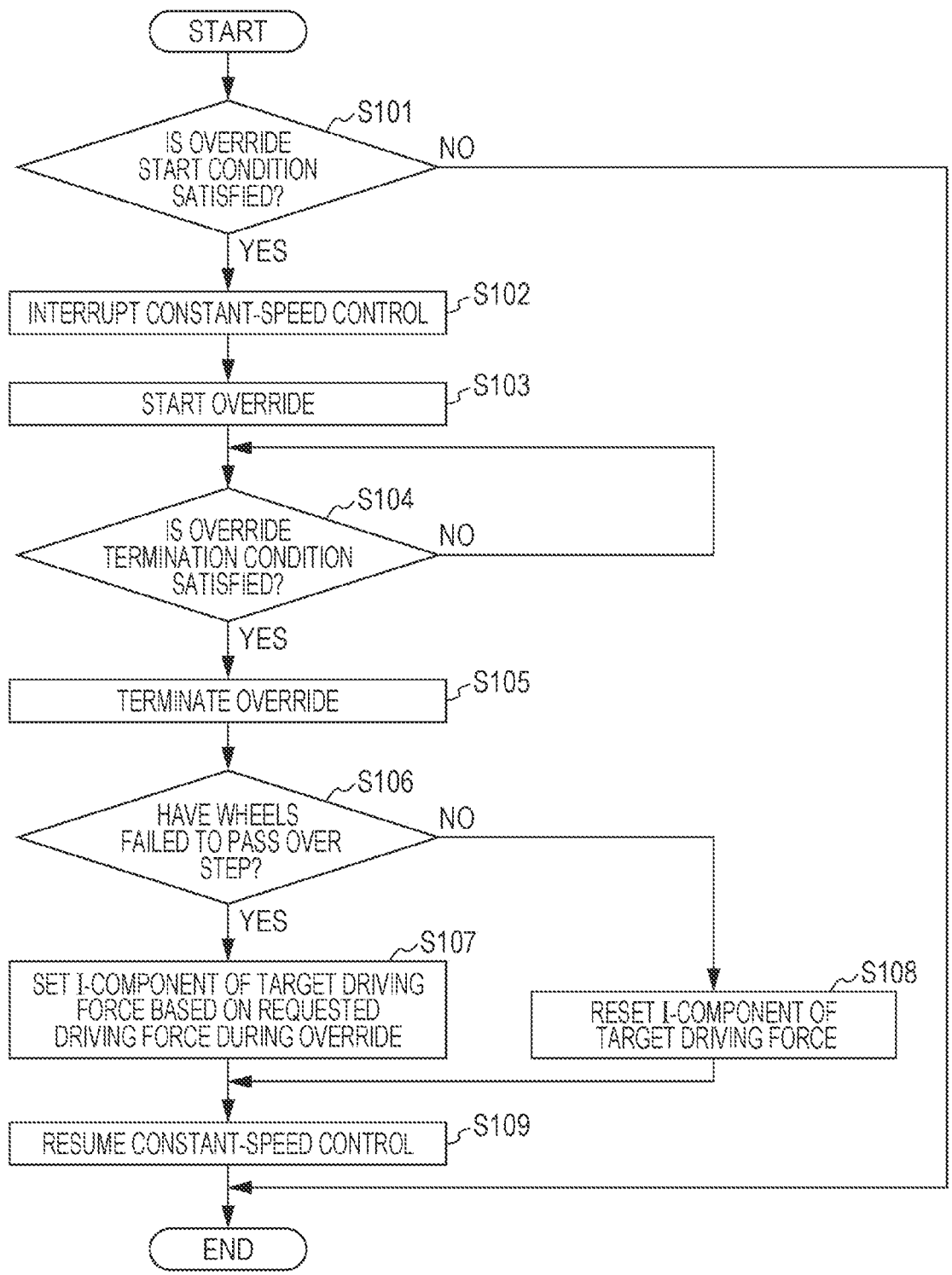
FIG. 3 is a flowchart illustrating an example of the flow of a process related to driving-force control performed by a controller during a constant-speed control mode in accordance with the embodiment of the disclosure.

FIG. 3 is a flowchart illustrating an example of the flow of the process related to the driving-force control performed by the controller 120 during the constant-speed control mode. The control flow illustrated in FIG. 3 starts in a state where the constant-speed control is being executed in the constant-speed control mode, and is repeatedly started upon completion.

As will be mentioned later, according to the control flow illustrated in FIG. 3, when the constant-speed control is to be resumed in a case where the override is terminated in a state where the wheels 11 have failed to pass over a step, an insufficient driving force of the vehicle 1 can be suppressed. The lower the target vehicle speed in the constant-speed control mode, the more likely the actual vehicle speed becomes insufficient relative to the vehicle speed to be used for causing the wheels 11 to pass over the step, thus increasing the possibility in which the wheels 11 may fail to pass over the step. Therefore, the wheels 11 tend to fail to pass over the step more likely in the low-constant-speed control mode than in the high-constant-speed control mode. Consequently, it is desirable that the controller 120 execute the following control flow in FIG. 3 particularly during the low-constant-speed control mode. Alternatively, the controller 120 may execute the following control flow in FIG. 3 during the high-constant-speed control mode.

When the control flow illustrated in FIG. 3 starts, the determiner 121 first determines in step S101 whether an override start condition is satisfied. The override start condition is satisfied when a requested driving force corresponding to the degree of opening of the accelerator pedal of the vehicle 1 exceeds a target driving force in constant-speed control. The requested driving force is a driving force that the driver has requested by operating the accelerator pedal. In other words, when the start condition is satisfied, the driver desires to interrupt the constant-speed control and increase the driving force of the vehicle 1.

If the determination result in step S101 indicates NO (i.e., if it is determined that the override start condition is not satisfied), the control flow illustrated in FIG. 3 ends. In contrast, if the determination result in step S101 indicates YES (i.e., if it is determined that the override start condition is satisfied), the control flow proceeds to step S102 where the motor controller 122 interrupts the constant-speed control. In step S103 following step S102, the motor controller 122 starts the override. In the override, the motor controller 122 controls the driving force of the vehicle 1 to the requested driving force corresponding to the degree of opening of the accelerator pedal.

In step S104 following step S103, the determiner 121 determines whether an override termination condition is satisfied. For example, the override termination condition is satisfied when the accelerator pedal is released by the driver. For example, if the requested driving force becomes smaller than the target driving force at the point when the constant-speed control is interrupted, the determiner 121 determines that the accelerator pedal is released.

If the determination result in step S104 indicates NO (i.e., if it is determined that the override termination condition is not satisfied), the determination process in step S104 is repeated. In contrast, if the determination result in step S104 indicates YES (i.e., if it is determined that the override termination condition is satisfied), the control flow proceeds to step S105 where the motor controller 122 terminates the override.

In step S106 following step S105, the determiner 121 determines whether the wheels 11 have failed to pass over a step. The wheels 11 may fail to pass over a step when the wheels 11 abut on the step in a situation where the vehicle 1 is trying to ride over the step. The step may be either one of a strip-like protrusion (e.g., a speed bump) provided on a road and a joint (e.g., a joint between a roadway and a sidewalk) between road surfaces of different heights. Regardless of the kind of step, the wheels 11 may sometimes abut on the step and fail to pass over the step.

In step S106, the determiner 121 determines whether the wheels 11 have failed to pass over the step based on, for example, the drive status of the driving motors 15 and the vehicle speed of the vehicle 1. For example, if a state where the vehicle speed is maintained to be lower than or equal to a threshold value (e.g., a value close to 0 km/h) continues for a reference time period or longer regardless of the fact that the driving motors 15 are driven and a driving force is generated in the vehicle 1, the determiner 121 determines that the wheels have failed to pass over the step. The reference time period is set to an appropriate time period in which it is determinable that there is no expectation for resolving the state where the vehicle speed is maintained to be lower than or equal to the threshold value regardless of the fact that a driving force is generated in the vehicle 1.

If the determination result in step S106 indicates YES (i.e., if it is determined that the wheels 11 have failed to pass over the step), the motor controller 122 sets an I-component (i.e., an integral-control component) of the target driving force in the constant-speed control based on the requested driving force during the override in step S107. For example, the motor controller 122 sets an integrated value of a deviation in integral control such that the I-component of the target driving force becomes a value corresponding to the requested driving force during the override.

With the I-component of the target driving force being set as described above, when the constant-speed control is to be resumed in a case where the override is terminated in the state where the wheels 11 have failed to pass over the step, the I-component of the target driving force is not reset (i.e., does not become zero), but becomes a value corresponding to the requested driving force during the override. Thus, an insufficient driving force of the vehicle 1 after the constant-speed control is resumed can be resolved, thereby suppressing, for example, a situation where the vehicle 1 rolls back on an uphill road. The process for setting the integrated value based on the requested driving force during the override will be described in detail later with reference to FIG. 5 to FIG. 7.

If the determination result in step S106 indicates NO (i.e., if it is determined that the wheels 11 have not failed to pass over the step), the control flow proceeds to step S108 where the motor controller 122 resets the I-component of the target driving force in the constant-speed control (i.e., sets the I-component to zero). For example, the motor controller 122 resets the I-component by resetting the integrated value of the deviation in the integral control. When the constant-speed control is to be resumed in a case where the override is terminated in a state where the wheels 11 have not failed to pass over the step (e.g., in a state where the wheels 11 have succeeded in passing over the step), it is desirable that the I-component be reset in this manner from the standpoint of suppressing sudden acceleration of the vehicle 1. For example, there may be a case where the vehicle 1 traveling on an uphill road during the override has entered a flat road upon termination of the override. In such a case, the vehicle 1 may possibly accelerate suddenly if the I-component is not reset.

After step S107 or step S108, the control flow proceeds to step S109 where the motor controller 122 resumes the constant-speed control, and the control flow illustrated in FIG. 3 ends.

A difference between a constant-speed control mode according to a comparative example and the constant-speed control mode according to this embodiment will now be described by comparing the two with reference to FIG. 4 and FIG. 5.

Figure 4:
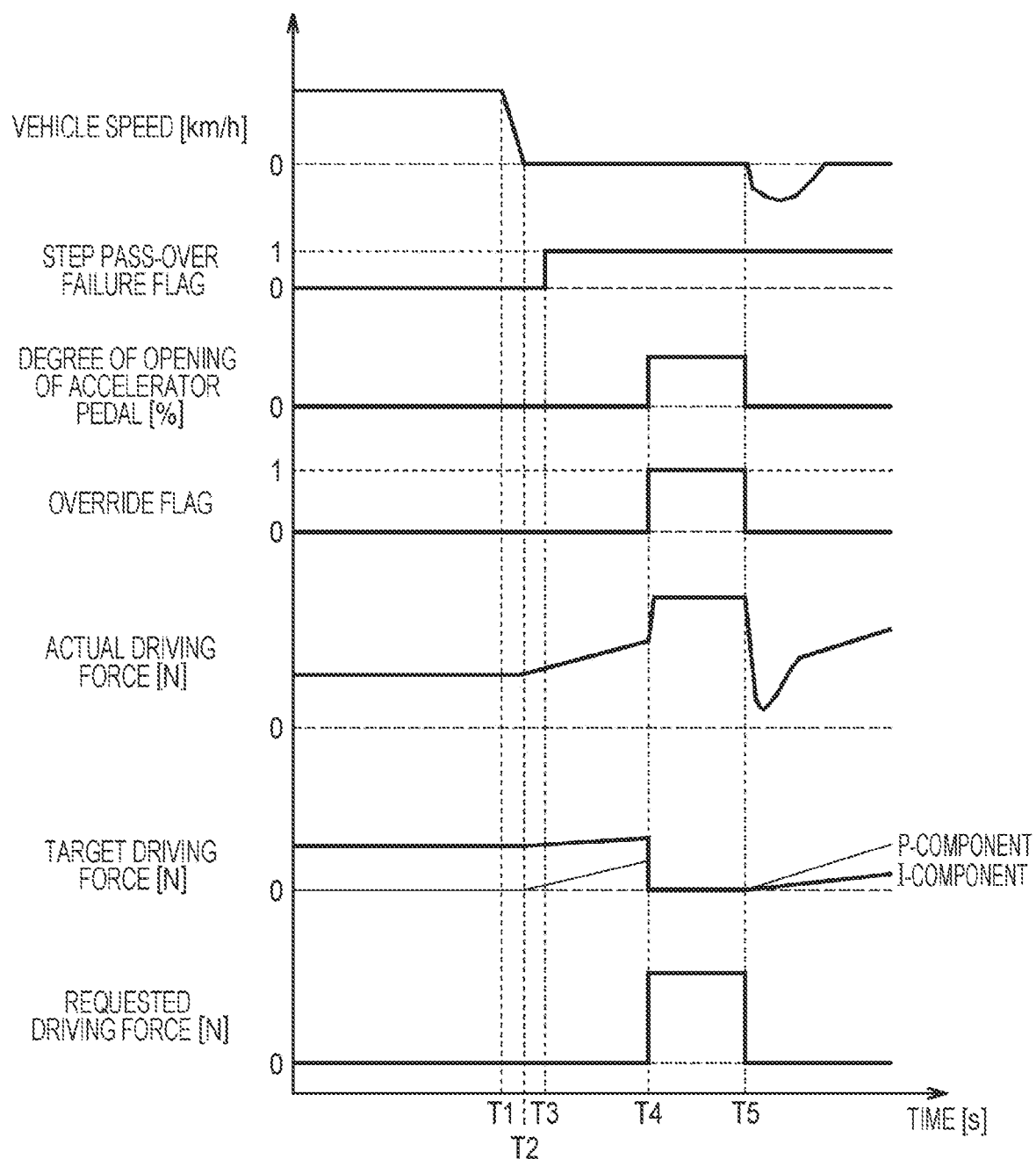
FIG. 4 illustrates an example of transition of various kinds of state quantities during a constant-speed control mode according to a comparative example.

FIG. 4 illustrates an example of transition of various kinds of state quantities during the constant-speed control mode according to the comparative example. FIG. 4 illustrates the transition of various kinds of state quantities including the vehicle speed [km/h], a step pass-over failure flag, the degree of opening [%] of the accelerator pedal, an override flag, an actual driving force [N], a target driving force [N] in constant-speed control, and a requested driving force [N]. The actual driving force [N] refers to a driving force actually applied to the vehicle 1. The D-component of the target driving force in the constant-speed control is not illustrated.

The step pass-over failure flag becomes 1 when it is determined that the wheels 11 have failed to pass over a step, and becomes 0 when it is determined that the wheels 11 have not failed to pass over a step. The override flag becomes 1 when override is executed, and becomes 0 when override is not executed. For example, each of the aforementioned flags is stored in a storage element of the control device 100 and is to be rewritten by the controller 120.

In the example illustrated in FIG. 4, the vehicle 1 is traveling on an uphill road prior to a time point T1 in a state where constant-speed control is being executed in the constant-speed control mode. Then, at the time point T1, the wheels 11 abut on a step and fail to pass over the step. The vehicle speed begins to decrease from the time point T1 and becomes 0 km/h at a time point T2. Accordingly, with the wheels 11 failing to pass over the step, the step pass-over failure flag switches from 0 to 1 at a time point T3 following the time point T2.

After the time point T2 at which the vehicle speed becomes km/h, the P-component of the target driving force in the constant-speed control increases, and the actual driving force also increases. However, from the time point T2 and onward, the state where the wheels 11 have failed to pass over the step is maintained. At a time point T4 following the time point T3, the driver operates the accelerator pedal. Thus, at the time point T4, the degree of opening of the accelerator pedal increases, and the requested driving force also increases. Then, when the requested driving force exceeds the target driving force, the constant-speed control is interrupted, and override is executed. Thus, the override flag switches from 0 to 1 at the time point T4. From the time point T4 and onward, the actual driving force is controlled to the requested driving force.

At a time point T5 following the time point T4, the driver releases the accelerator pedal. Thus, at the time point T5, the degree of opening of the accelerator pedal decreases to 0, and the requested driving force also decreases to 0. Then, as the accelerator pedal is released by the driver, the override is terminated, and the constant-speed control is resumed. Thus, at the time point T5, the override flag switches from 1 to 0.

In the comparative example, the I-component of the target driving force in the constant-speed control at the time point T5 when the override is terminated and the constant-speed control is to be resumed is reset to zero regardless of whether the wheels 11 have failed to pass over the step. Then, from the time point T5 and onward, the I-component of the target driving force increases from zero. Because the I-component is calculated based on the integrated value of the deviation between the vehicle speed and the target vehicle speed, the I-component changes gradually. Thus, the target driving force in the constant-speed control from the time point T5 and onward increases gradually from zero. Consequently, the actual driving force is insufficient from the time point T5 and onward, thus causing the vehicle 1 to roll back. In the example in FIG. 4, the vehicle speed from the time point T5 and onward is a negative value, so that the vehicle 1 moves rearward.

Figure 5:
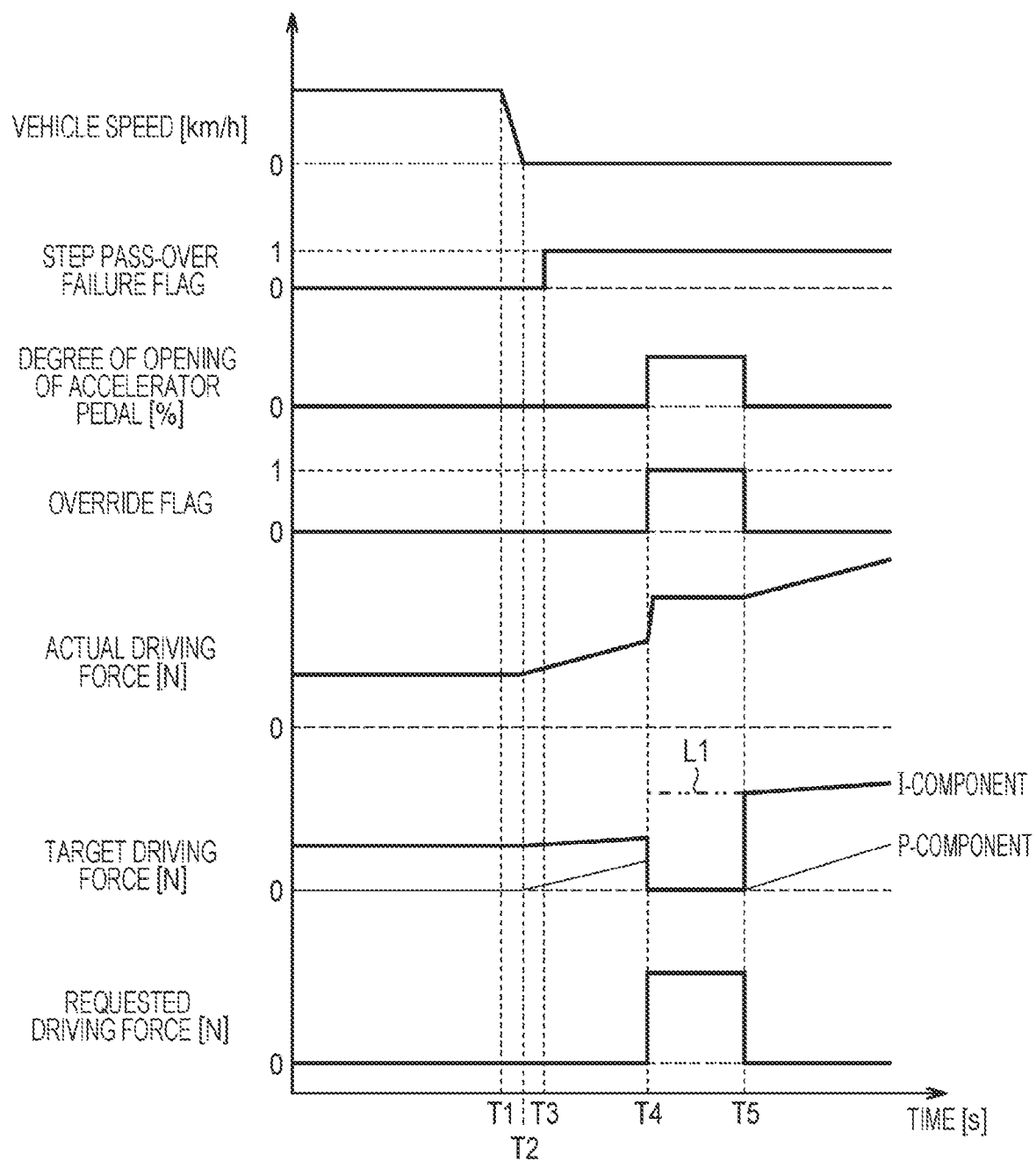
FIG. 5 illustrates an example of transition of various kinds of state quantities during the constant-speed control mode according to this embodiment.

FIG. 5 illustrates an example of transition of various kinds of state quantities during the constant-speed control mode according to this embodiment. The state quantities illustrated in FIG. 5 are the same as those in FIG. 4.

As mentioned above, in this embodiment, when the override is terminated and the constant-speed control is to be resumed, if the wheels 11 have failed to pass over a step, the controller 120 sets the I-component (i.e., the integral-control component) of the target driving force in the constant-speed control based on the requested driving force during the override. In the example in FIG. 5, it is determined that the wheels 11 have failed to pass over the step at the time point T5 at which the constant-speed control is to be resumed. Thus, unlike the example in FIG. 4, the I-component of the target driving force in the constant-speed control is not reset (i.e., does not become zero), and becomes a value corresponding to the requested driving force in the time period between the time point T4 and the time point T5 between which the override is being executed.

In the example in FIG. 5, the requested driving force is substantially fixed in the time period between the time point T4 and the time point T5. In the graph of the target driving force in FIG. 5, the requested driving force in the time period between the time point T4 and the time point T5 is indicated with a double-dot chain line L1. For example, the controller 120 sets the I-component of the target driving force in the constant-speed control at the time point T5 at which the constant-speed control is to be resumed such that the I-component matches the requested driving force in the time period between the time point T4 and the time point T5. Alternatively, the controller 120 may set the I-component of the target driving force at the time point T5 to a value obtained by adding or subtracting a predetermined adjustment value to or from the requested driving force in the time period between the time point T4 and the time point T5.

As described above, in the example in FIG. 5, at the time point T5 at which the constant-speed control is to be resumed in a case where the override is terminated in a state where the wheels 11 have failed to pass over the step, the I-component of the target driving force in the constant-speed control becomes the requested driving force in the time period between the time point T4 and the time point T5. Thus, from the time point T5 and onward, the target driving force in the constant-speed control increases from the requested driving force in the time period between the time point T4 and the time point T5. Consequently, from the time point T5 and onward, an insufficient actual driving force is resolved, thereby suppressing a situation where the vehicle 1 rolls back. In the example in FIG. 5, the vehicle speed from the time point T5 and onward is maintained at 0 km/h, so that the vehicle 1 does not move rearward.

In the example in FIG. 5 described above, the requested driving force is substantially fixed during the override. However, the requested driving force may possibly change during the override. An example where the requested driving force changes during the override will be described below with reference to FIG. 6 and FIG. 7.

Figure 6:
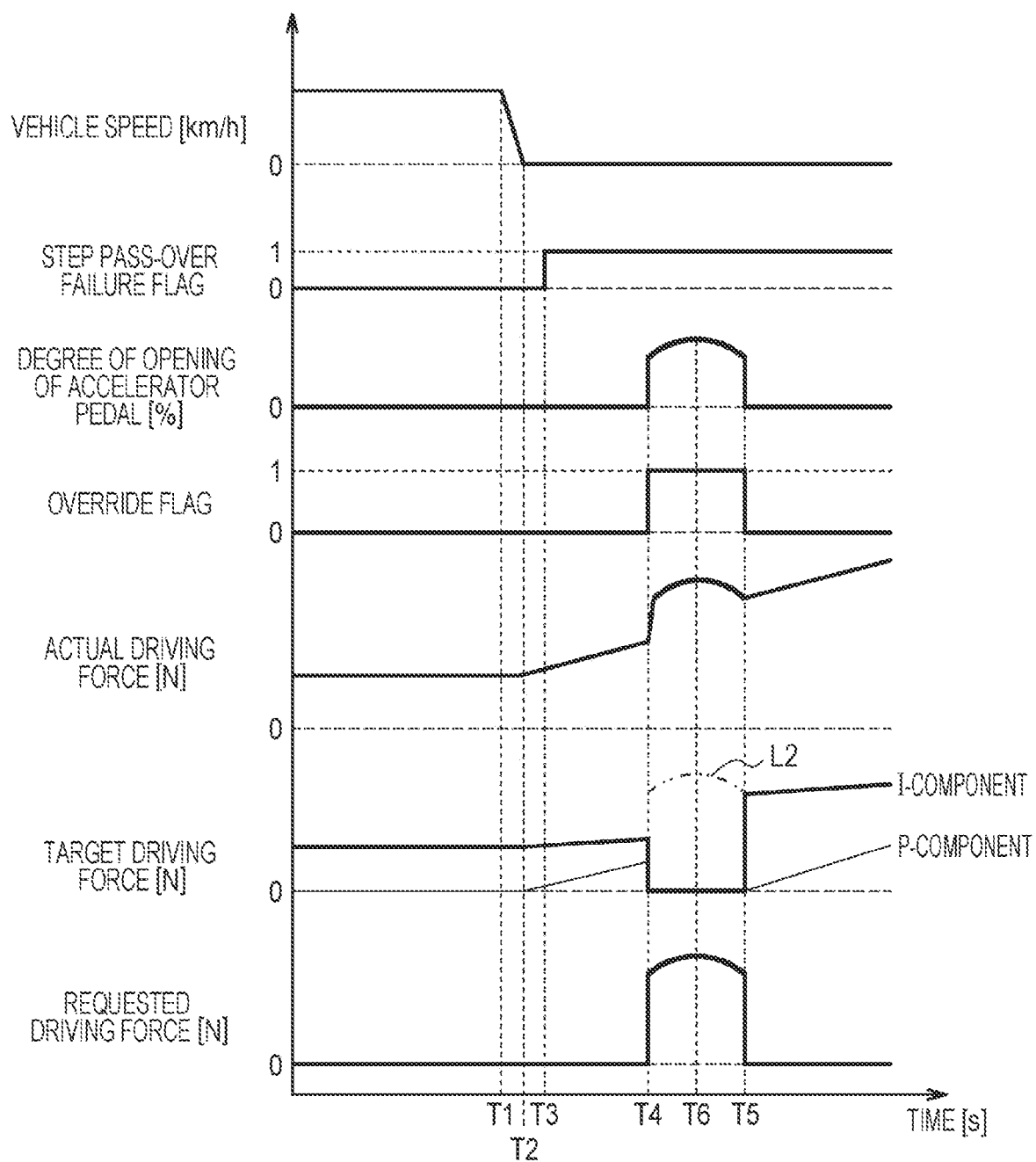
FIG. 6 illustrates an example of transition of various kinds of state quantities during the constant-speed control mode according to this embodiment, the example being different from the example in FIG. 5.

FIG. 6 illustrates an example of transition of various kinds of state quantities during the constant-speed control mode according to this embodiment. This example is different from the example in FIG. 5. The state quantities illustrated in FIG. 6 are the same as those in FIG. 4 and FIG. 5.

The example in FIG. 6 is different from the example in FIG. 5 in that the requested driving force changes in the time period between the time point T4 and the time point T5 between which override is being executed. For example, the requested driving force increases from the time point T4 to a time point T6, reaches a maximum at the time point T6, and then decreases from the time point T6 to the time point T5. In the graph of the target driving force in FIG. 6, the requested driving force in the time period between the time point T4 and the time point T5 is indicated with a double-dot chain line L2.

In the example in FIG. 6, at the time point T5 at which the constant-speed control is to be resumed, the controller 120 sets the I-component of the target driving force in the constant-speed control to a value corresponding to the requested driving force at the time point T5 at which the override is terminated. For example, at the time point T5, the controller 120 sets the I-component of the target driving force in the constant-speed control to match the requested driving force at the time point T5 at which the override is terminated. Consequently, this suppresses a situation where the driver feels a sense of discomfort due to a significant change in the driving force applied to the vehicle 1 after the constant-speed control is resumed. Alternatively, at the time point T5, the controller 120 may set the I-component of the target driving force to a value obtained by adding or subtracting a predetermined adjustment value to or from the requested driving force at the time point T5 at which the override is terminated.

Figure 7:
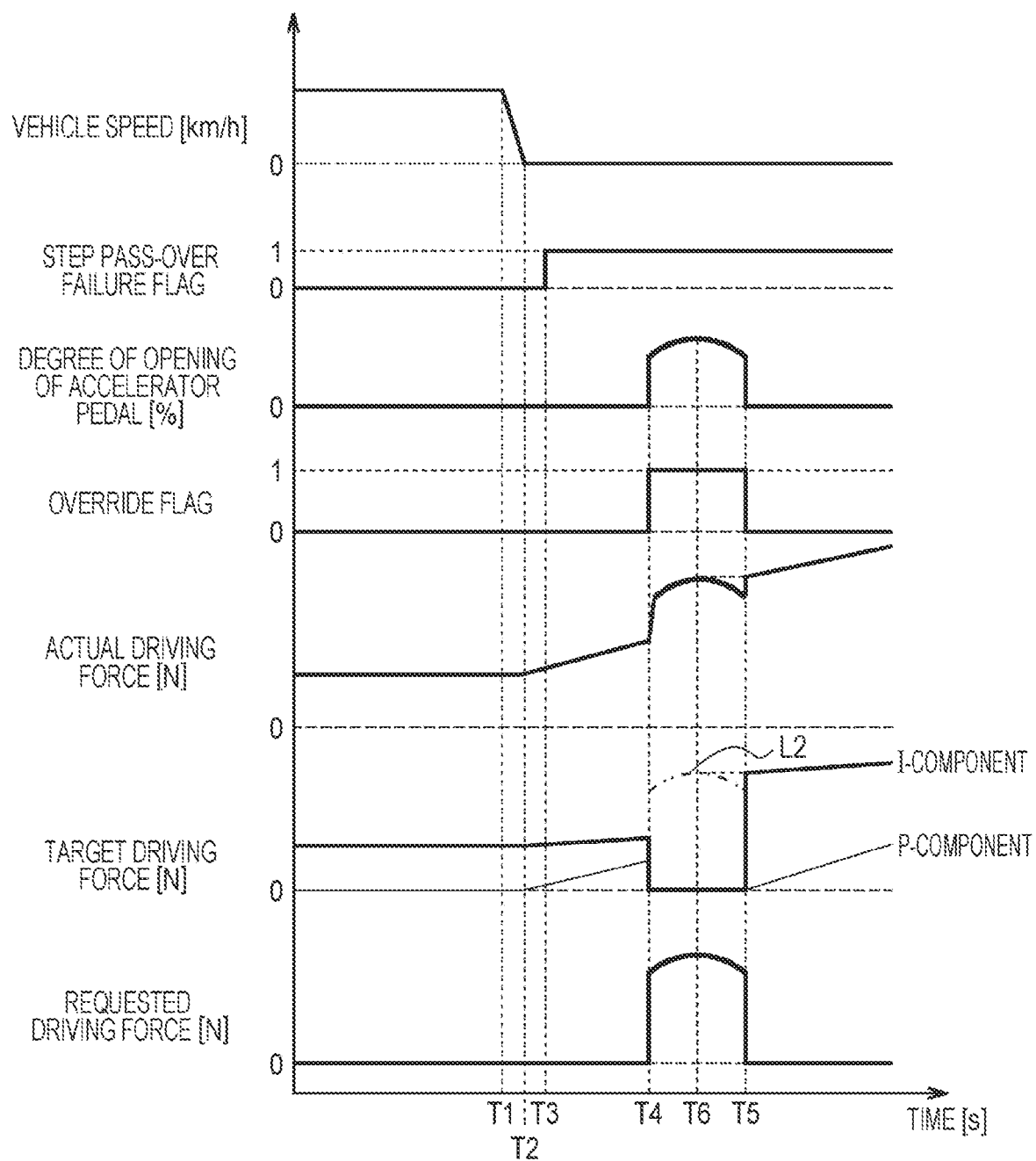
FIG. 7 illustrates an example of transition of various kinds of state quantities during the constant-speed control mode according to this embodiment, the example being different from the examples in FIG. 5 and FIG. 6.

FIG. 7 illustrates an example of transition of various kinds of state quantities during the constant-speed control mode according to this embodiment. This example is different from the examples in FIG. 5 and FIG. 6. The state quantities illustrated in FIG. 7 are the same as those in FIG. 4 to FIG. 6. In the example in FIG. 7, the requested driving force changes similarly to the example in FIG. 6 in the time period between the time point T4 and the time point T5 between which override is being executed.

In the example in FIG. 7, at the time point T5 at which the constant-speed control is to be resumed, the controller 120 sets the I-component of the target driving force in the constant-speed control to a value corresponding to a maximum value (i.e., the requested driving force at the time point T6) of the requested driving force in the time period between the time point T4 and the time point T5 between which override is being executed. For example, at the time point T5, the controller 120 sets the I-component of the target driving force in the constant-speed control to match the requested driving force at the time point T6. Thus, an insufficient driving force of the vehicle 1 after the constant-speed control is resumed can be resolved more effectively. Consequently, for example, a situation where the vehicle 1 rolls back on an uphill road can be further suppressed, and moreover, the vehicle 1 can ride over a step at an early stage. Alternatively, at the time point T5, the controller 120 may set the I-component of the target driving force to a value obtained by adding or subtracting a predetermined adjustment value to or from the requested driving force at the time point T6.

In the constant-speed control mode, if the wheels 11 have failed to pass over the step when the constant-speed control is to be resumed, the controller 120 may set the I-component of the target driving force based on another parameter in addition to the requested driving force during the override. An example of another parameter is the gradient of the road on which the vehicle 1 is traveling. The gradient of the road may be acquired by using, for example, either one of a detection result of a sensor that detects the acceleration of the vehicle 1 and map data.

If the road is inclined upward relative to the traveling direction (i.e., if the road is an uphill road), it is highly desirable that the I-component of the target driving force be increased so that, after the constant-speed control is resumed, a situation where the vehicle 1 rolls back can be further suppressed and the vehicle 1 can ride over the step at an early stage. On the other hand, if the road is inclined downward relative to the traveling direction (i.e., if the road is a downhill road), it is highly desirable that the I-component of the target driving force be close to the requested driving force at the time of termination of the override so that, after the constant-speed control is resumed, a situation where the driver feels a sense of discomfort due to a significant change in the driving force applied to the vehicle 1 can be suppressed.

Thus, for example, if the road is an uphill road in a case where the wheels 11 have failed to pass over the step when the constant-speed control is to be resumed, the controller 120 may set the I-component of the target driving force to a value corresponding to the maximum value of the requested driving force during the override. On the other hand, if the road is a downhill road in a case where the wheels 11 have failed to pass over the step when the constant-speed control is to be resumed, the controller 120 may set the I-component of the target driving force to a value corresponding to the requested driving force at the time of termination of the override.

If the road is an uphill road, the controller 120 may change the set value of the I-component of the target driving force in accordance with the gradient of the road. Likewise, if the road is a downhill road, the controller 120 may change the set value of the I-component of the target driving force in accordance with the gradient of the road.

Effects of Control Device

Next, the effects of the control device 100 according to the embodiment of the disclosure will be described.

In the control device 100 according to this embodiment, when the override is terminated and the constant-speed control is to be resumed, if the wheels 11 have failed to pass over a step, the controller 120 sets the I-component (i.e., the integral-control component) of the target driving force in the constant-speed control based on the requested driving force during the override. Accordingly, when the constant-speed control is to be resumed in a case where the override is terminated in a state where the wheels 11 have failed to pass over the step, the I-component of the target driving force is not reset (i.e., does not become zero), but becomes a value corresponding to the requested driving force during the override. Thus, an insufficient driving force of the vehicle 1 after the constant-speed control is resumed can be resolved. Consequently, this suppresses, for example, a situation where the vehicle 1 rolls back on an uphill road. Moreover, for example, on a downhill road, a significantly insufficient driving force of the vehicle 1 relative to a driving force to be used for riding over the step can be resolved.

Furthermore, in the control device 100 according to this embodiment, if the wheels 11 have failed to pass over a step when the constant-speed control is to be resumed in the constant-speed control mode, the controller 120 desirably sets the I-component of the target driving force to a value corresponding to the requested driving force at the time of termination of the override. Consequently, this suppresses a situation where the driver feels a sense of discomfort due to a significant change in the driving force applied to the vehicle 1 after the constant-speed control is resumed.

Moreover, in the control device 100 according to this embodiment, if the wheels 11 have failed to pass over a step when the constant-speed control is to be resumed in the constant-speed control mode, the controller 120 desirably sets the I-component of the target driving force to a value corresponding to a maximum value of the requested driving force during the override. Thus, an insufficient driving force of the vehicle 1 after the constant-speed control is resumed can be resolved more effectively. Consequently, for example, a situation where the vehicle 1 rolls back on an uphill road can be further suppressed, and moreover, the vehicle 1 can ride over the step at an early stage.

Furthermore, in the control device 100 according to this embodiment, if the wheels 11 have failed to pass over a step when the constant-speed control is to be resumed in the constant-speed control mode, the controller 120 desirably sets the I-component of the target driving force based on the gradient of the road on which the vehicle 1 is traveling in addition to the requested driving force during the override. Thus, when the constant-speed control is to be resumed in a case where the override is terminated in a state where the wheels 11 have failed to pass over the step, the I-component of the target driving force can be set more appropriately based on the gradient of the road.

Moreover, in the control device 100 according to this embodiment, if the wheels 11 have failed to pass over a step when the constant-speed control is to be resumed in the low-constant-speed control mode, the controller 120 desirably sets the I-component of the target driving force based on the requested driving force during the override. As mentioned above, the wheels 11 tend to fail to pass over the step more likely in the low-constant-speed control mode than in the high-constant-speed control mode. Consequently, the effect of resolving an insufficient driving force of the vehicle 1 after the constant-speed control is resumed can be utilized effectively.

Although the preferred embodiment of the disclosure has been described above with reference to the appended drawings, the embodiment of the disclosure is not limited to that described above. Needless to say, various modifications and alterations within the scope defined in the claims are included in the technical scope of the embodiment of the disclosure.

For example, although the vehicle 1 described above is an electric vehicle equipped with the front-wheel driving motor 15f and the rear-wheel driving motor 15r as driving sources, the configuration of the vehicle equipped with the control device according to the embodiment of the disclosure is not particularly limited to the vehicle 1. For example, the vehicle equipped with the control device according to the embodiment of the disclosure may be either one of an electric vehicle provided with driving motors (i.e., four driving motors) for the individual wheels and a hybrid vehicle equipped with a driving motor and an engine as driving sources. Furthermore, for example, the vehicle equipped with the control device according to the embodiment of the disclosure may be a vehicle obtained by adding a component to, changing a component in, or deleting a component from the vehicle 1 described with reference to FIG. 1.

Furthermore, for example, the processing described with reference to the flowchart in this description may be executed in a sequence different from that indicated in the flowchart. Moreover, an additional step may be used, or one or more steps may be omitted.

The control device 100 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 100 including the identifier 110 and the controller 120. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle control device to be applied to a vehicle, wherein the vehicle has a normal mode in which a driving force of the vehicle is controlled in accordance with a driver of the vehicle pressing and releasing an accelerator pedal, and a constant-speed control mode in which the driving force is controlled to maintain a speed of the vehicle at a target speed without requiring the driver to press and release the accelerator pedal, the vehicle control device comprising:

at least one processor; and
at least one memory storing a program, when executed, causing the at least one processor to be configured to:
perform constant-speed control in the constant-speed control mode to adjust the driving force of the vehicle to match a target driving force, wherein the target driving force includes a component of integral control, and wherein the at least one processor is configured to calculate the component of the integral control by integrating a deviation between a speed of the vehicle and the target speed of the vehicle;
in response to detecting that the driver has pressed an accelerator pedal to require the driving force to exceed the target driving force during the constant-speed control in the constant-speed control mode, allow an override of the constant-speed control and enable the driver to control the driving force manually using the accelerator pedal;
in response to determining that the override has been ended, determine whether the vehicle has failed to drive over a step when the speed of the vehicle remains lower than or equal to a threshold for a predetermined time period while the driving force is greater than zero;
in response to determining that the vehicle has not failed to drive over the step, set the component of the integral control in the target driving force to zero, and resume the constant-speed control based on the target driving force after the component of the integral control has been set to zero; and
in response to determining that the vehicle has failed to drive over the step, set the component of the integral control in the target driving force to a value corresponding to the driving force required by the driver pressing the accelerator pedal during the override, and resume the constant-speed control based on the target driving force including the component of the integral control that has been set.

2. The vehicle control device according to claim 1, wherein in response to determining that the vehicle has failed to drive over the step, the at least one processor is configured to set the component of the integral control in the target driving force to a value corresponding to the driving force required by the driver pressing the accelerator pedal at a time when the override has ended.

3. The vehicle control device according to claim 2, wherein in response to determining that the vehicle has failed to drive over the step, the at least one processor is configured to set the component of the integral control in the target driving force to a value corresponding to a maximum value of the driving force required by the driver pressing the accelerator pedal during the override.

4. The vehicle control device according to claim 3, wherein in response to determining that the vehicle has failed to drive over the step, the at least one processor is configured to set the component of the integral control in the target driving force based on a gradient of a road on which the vehicle is traveling in addition to the driving force required by the driver pressing the accelerator pedal during the override.

5. The vehicle control device according to claim 3,
wherein the constant-speed control mode comprises a high-constant-speed control mode and a low-constant-speed control mode in which the target speed is set to a value lower than a value of the high-constant-speed control mode, and
wherein when the constant-speed control mode is set to the low-constant-speed control mode, and in response to determining that the vehicle has failed to drive over the step, the at least one processor is configured to set the component of the integral control in the target driving force based on the driving force required by the driver pressing the accelerator pedal during the override.

6. The vehicle control device according to claim 2, wherein in response to determining that the vehicle has failed to drive over the step, the at least one processor is configured to set the component of the integral control in the target driving force based on a gradient of a road on which the vehicle is traveling in addition to the driving force required by the driver pressing the accelerator pedal during the override.

7. The vehicle control device according to claim 2,
wherein the constant-speed control mode comprises a high-constant-speed control mode and a low-constant-speed control mode in which the target speed is set to a value lower than a value of the high-constant-speed control mode, and
wherein when the constant-speed control mode is set to the low-constant-speed control mode, and in response to determining that the vehicle has failed to drive over the step, the at least one processor is configured to set the component of the integral control in the target driving force based on the driving force required by the driver pressing the accelerator pedal during the override.

8. The vehicle control device according to claim 7, wherein the at least one processor is configured to determine that the vehicle has not failed to drive over the step when a state where the vehicle speed is maintained to be lower than or equal to a threshold value continues for a reference time period or longer while the driving force is greater than zero.

9. The vehicle control device according to claim 2, wherein the at least one processor is configured to determine that the vehicle has not failed to drive over the step when a state where the vehicle speed is maintained to be lower than or equal to a threshold value continues for a reference time period or longer while the driving force is greater than zero.

10. The vehicle control device according to claim 1, wherein in response to determining that the vehicle has failed to drive over the step, the at least one processor is configured to set the component of the integral control in the target driving force to a value corresponding to a maximum value of the driving force required by the driver pressing the accelerator pedal during the override.

11. The vehicle control device according to claim 10, wherein in response to determining that the vehicle has failed to drive over the step, the at least one processor is configured to set the component of the integral control in the target driving force based on a gradient of a road on which the vehicle is traveling in addition to the driving force required by the driver pressing the accelerator pedal during the override.

12. The vehicle control device according to claim 10,
wherein the constant-speed control mode comprises a high-constant-speed control mode and a low-constant-speed control mode in which the target speed is set to a value lower than a value of the high-constant-speed control mode, and
wherein when the constant-speed control mode is set to the low-constant-speed control mode, and in response to determining that the vehicle has failed to drive over the step, the at least one processor is configured to set the component of the integral control in the target driving force based on the driving force required by the driver pressing the accelerator pedal during the override.

13. The vehicle control device according to claim 10, wherein the at least one processor is configured to determine that the vehicle has not failed to drive over the step when a state where the vehicle speed is maintained to be lower than or equal to a threshold value continues for a reference time period or longer while the driving force is greater than zero.

14. The vehicle control device according to claim 1, wherein in response to determining that the vehicle has failed to drive over the step, the at least one processor is configured to set the component of the integral control in the target driving force based on a gradient of a road on which the vehicle is traveling in addition to the driving force required by the driver pressing the accelerator pedal during the override.

15. The vehicle control device according to claim 14, wherein the at least one processor is configured to determine that the vehicle has not failed to drive over the step when a state where the vehicle speed is maintained to be lower than or equal to a threshold value continues for a reference time period or longer while the driving force is greater than zero.

16. The vehicle control device according to claim 1,
wherein the constant-speed control mode comprises a high-constant-speed control mode and a low-constant-speed control mode in which the target speed is set to a value lower than a value of the high-constant-speed control mode, and
wherein when the constant-speed control mode is set to the low-constant-speed control mode, and in response to determining that the vehicle has failed to drive over the step, the at least one processor is configured to set the component of the integral control in the target driving force based on the driving force required by the driver pressing the accelerator pedal during the override.

17. The vehicle control device according to claim 1, wherein the at least one processor is configured to determine that the vehicle has not failed to drive over the step when a state where the vehicle speed is maintained to be lower than or equal to a threshold value continues for a reference time period or longer while the driving force is greater than zero.

18. A vehicle control device to be applied to a vehicle, wherein the vehicle has a normal mode in which a driving force of the vehicle is controlled in accordance with a driver of the vehicle pressing and releasing an accelerator pedal, and a constant-speed control mode in which the driving force is controlled to maintain a speed of the vehicle at a target speed without requiring the driver to press and release the accelerator pedal, the vehicle control device comprising:
circuitry configured to:
perform constant-speed control in the constant-speed control mode to adjust the driving force of the vehicle to match a target driving force, wherein the target driving force includes a component of integral control, and wherein the circuitry is configured to calculate the component of the integral control by integrating a deviation between a speed of the vehicle and the target speed of the vehicle;

in response to detecting that the driver has pressed an accelerator pedal to require the driving force to exceed the target driving force during the constant-speed control in the constant-speed control mode, allow an override the constant-speed control and enable the driver to control the driving force manually using the accelerator pedal;

in response to determining that the override has been ended, determine whether the vehicle has failed to drive over a step when the speed of the vehicle remains lower than or equal to a threshold for a predetermined time period while the driving force is greater than zero;

in response to determining that the vehicle has not failed to drive over the step, set the component of the integral control in the target driving force to zero, and resume the constant-speed control based on the target driving force after the component of the integral control has been set to zero; and in response to determining that the vehicle has failed to drive over the step, set the component of the integral control in the target driving force to a value corresponding to the driving force required by the driver pressing the accelerator pedal during the override, and resume the constant-speed control based on the target driving force including the component of the integral control that has been set.

* * * * *